United States Patent [19]

Selker

[11] Patent Number: 4,780,707

[45] Date of Patent: Oct. 25, 1988

[54] ANALOG INPUT DEVICE FOR A COMPUTER

[76] Inventor: Edwin J. Selker, 550 Vista Ave., Palo Alto, Calif. 94306

[21] Appl. No.: 756,370

[22] Filed: Jul. 18, 1985

[51] Int. Cl.[4] .............................................. G09G 1/00
[52] U.S. Cl. .................................... 340/710; 340/706; 178/18; 235/472; 382/59
[58] Field of Search ............... 340/706, 707, 708, 710; 178/18; 382/59; 434/164, 166, 117; 250/221; 235/472

[56] References Cited

U.S. PATENT DOCUMENTS

| | | | |
|---|---|---|---|
| 1,143,393 | 6/1915 | Higbee | 434/164 |
| 1,251,206 | 12/1881 | Forbusl | 434/166 |
| 1,416,564 | 5/1922 | Lowe | 434/166 |
| 3,238,501 | 3/1966 | Mak et al. | 340/146.3 |
| 3,376,551 | 4/1968 | Armbruster | 178/18 |
| 3,417,234 | 12/1968 | Sundblad | 235/61.11 |
| 3,462,548 | 8/1969 | Rinder | 382/59 X |
| 3,761,877 | 9/1973 | Fernald | 340/146.3 SY |
| 4,457,016 | 6/1984 | Pfeffer | 382/59 |
| 4,472,710 | 9/1984 | Sukuki et al. | 382/59 X |
| 4,495,646 | 1/1985 | Gharachorloo | 382/59 |
| 4,543,571 | 9/1985 | Bilbrey et al. | 178/18 X |
| 4,550,316 | 10/1985 | Wheatstone et al. | 178/18 X |
| 4,553,035 | 11/1985 | Malinsky et al. | 382/59 |
| 4,561,183 | 12/1985 | Shores | 340/710 |
| 4,670,751 | 6/1987 | Enokido et al. | 340/707 |

FOREIGN PATENT DOCUMENTS 57-37971  3/1982  Japan ...................................... 382/59

Primary Examiner—Gerald L. Brigance
Assistant Examiner—Mahmoud Fatahi-yar
Attorney, Agent, or Firm—Kenneth E. Leeds

[57] ABSTRACT

An improved mouse includes a stylus and a base. Transducers in the stylus detect motion of the mouse relative to a surface. In this way, the stylus can be used as a pen-shape mouse or inserted into the base, which can then be operated as a more conventional mouse.

10 Claims, 3 Drawing Sheets

ANALOG INPUT DEVICE FOR A COMPUTER

BACKGROUND OF THE INVENTION

This invention relates to input devices for a computer and more specifically to a type of analog input device known as a mouse.

It is known in the art to enter information into a computer using an analog input device known as a mouse. A mouse is particularly useful for entering positional information into computers. A typical mouse has the shape of a rectangular prism having dimensions of about 1.5 by 1.0 by 2.5 inches and rests on a surface, e.g. a table top. A person using the mouse moves the mouse relative to the surface. Transducers in the mouse detect and provide electrical signals indicative of this movement. A host computer receives these signals and responds appropriately. These signals can be used by a computer to move a cursor around on a CRT screen so as to enable a user to determine where on the screen text is to be entered. In addition, a mouse can be used to draw images on the screen.

Some prior art mouse devices use electro-mechanical transducers. For example, referring to FIG. 1, on the bottom of a mouse 10 is a rotatably mounted sphere 12. As mouse 10 is moved across surface 14, sphere 12 rotates. Sphere 12 is mounted so as to push against a shaft 16. Therefore, as mouse 10 moves in a first direction, sphere 12 rotates causing shaft 16 to rotate. This rotation is detected with an electro-mechanical transducer such as shaft encoder 18. A second shaft and shaft encoder (not shown) are also included in mouse 10 to detect motion in a second direction perpendicular to the first direction.

Another prior art mouse is mouse 20 (FIG. 2) which rests on a surface 22. Surface 22 has formed thereon a set of lines 24 of a first color and a set of lines 26 perpendicular to lines 24 of a second color. An opto-electrical transducer 28 is sensitive to light of the first color but not the second. As mouse 20 passes over lines 24, transducer 28 provides electrical signals indicative of motion in the direction indicated by arrow A. Similarly, as mouse 20 passes over lines 26, a second opto-electrical transducer 30 provides signals indicative of motion in the direction indicated by arrow B.

It is also known in the art to provide a data input device known as a digitizing pad. One example of a digitizing pad is bit pad 32 illustrated in FIG. 3. Bit pad 32 includes a surface having a grid of horizontal wires 34 and vertical wires 36, each wire being electrically insulated from the others. A voltage is sequentially applied to each wire within wires 34 and 36. A stylus 38 is placed on bit pad 32 by a user. Stylus 38 includes a voltage sensing device 40. When voltage sensing device 40 detects the presence of a strong electric field, the position of sensing device 40 is determined, since it is known that device 40 only detects strong electric fields when near the wire receiving the voltage.

Although mouse devices provide signals to a computer which accurately indicate movement of the mouse, Applicant has found that a mouse shaped like a rectangular prism is difficult to draw with. This is true in part because the dexterity in an average person's thumb and opposing forefinger, which in general is the most dexterous part of the hand, cannot be exploited well in a typical prism-shaped mouse. While stylus-shaped devices are easier to draw with, the time spent finding a stylus, picking it up, putting it down, and picking it up again represents an inconvenience.

SUMMARY OF THE INVENTION

In a first embodiment of the invention, a mouse is provided having a rectangular prism-shaped base having a stylus handle extending therefrom. In this way, the position of the mouse is controlled by a pen-shaped implement, and is therefore easier to draw with, but because the mouse includes a rectangular prism base, it can be operated in the same way as a conventional mouse. In a second embodiment of the invention, a stylus is provided having an opto-electrical transducer at one end thereof. The stylus is electrically coupled to a computer and is used as a mouse. When desired, the stylus is inserted into a rectangular prism having a hole formed therein. In this way, an operator has the option of using a stylus-shaped mouse or affixing the mouse to a rectangular prism-shaped support and entering data into the computer by moving the prism-shaped support.

DETAILED DESCRIPTION

Figure 1:
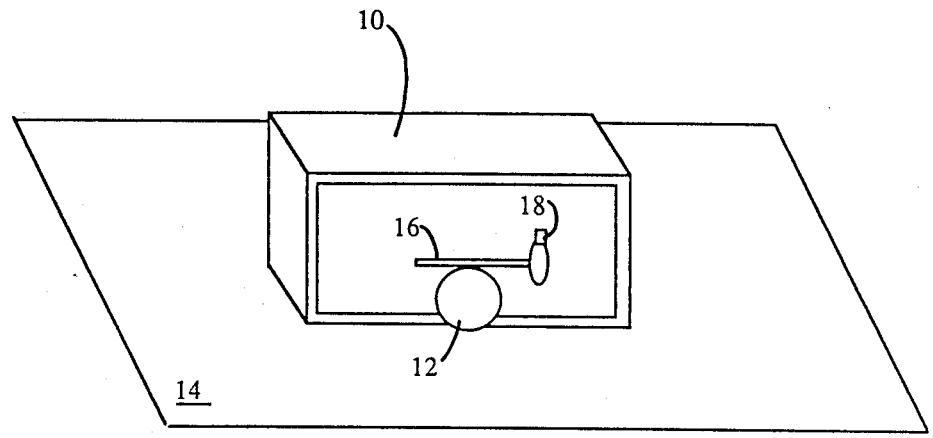
FIGS. 1 and 2 are illustrations of mouse devices constructed in accordance with the prior art.
Figure 2:
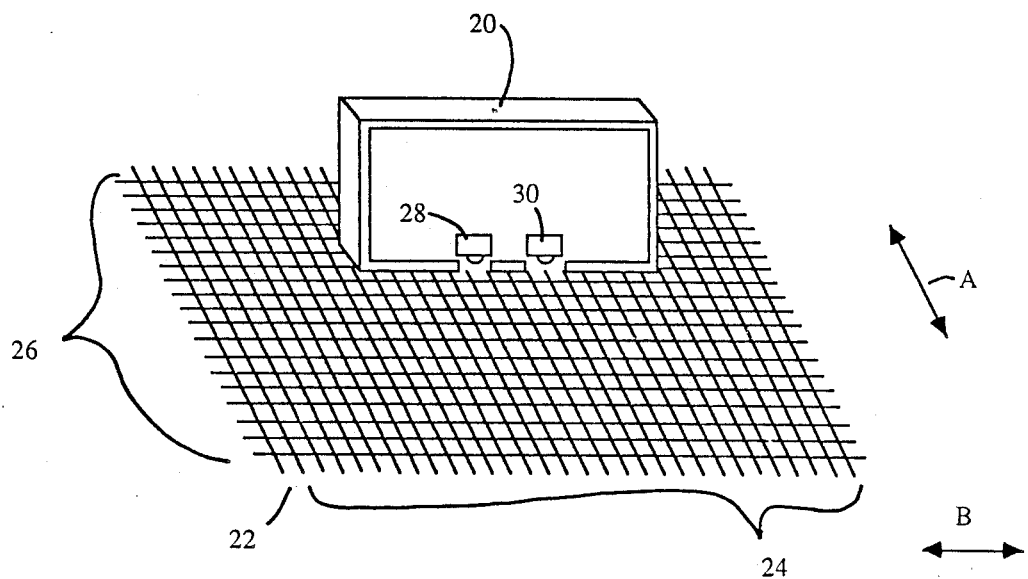
Figure 3:
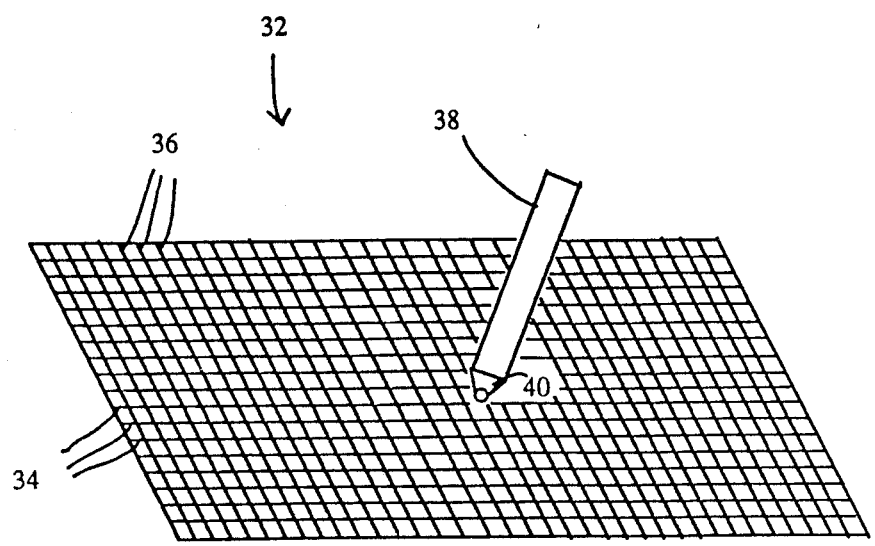
FIG. 3 is an illustration of a bit pad constructed in accordance with the prior art.
Figure 4:
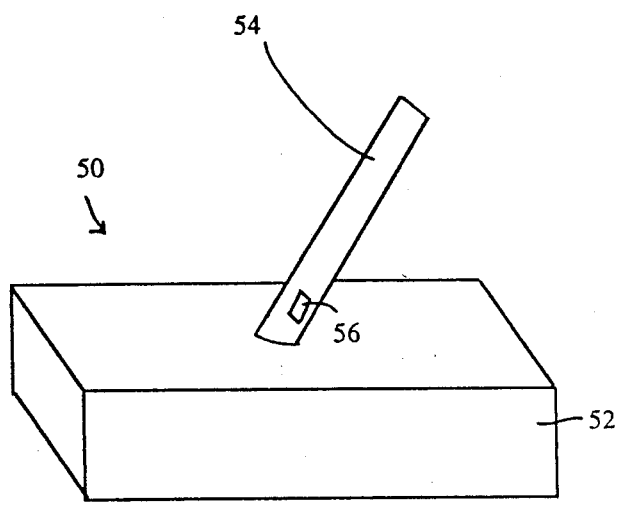
FIG. 4 is an illustration of a mouse constructed in accordance with one embodiment of the present invention.

A mouse constructed in accordance with a first embodiment of the present invention is illustrated in FIG. 4. Referring to FIG. 4, a mouse 50 includes a rectangular prism-shaped base 52 and a stylus-shaped handle 54. In one embodiment, base 52 is about 1.5 inches by 2 inches by 0.5 inches, and handle 54 is roughly cylindrical, having a diameter of about 0.3 inches and a length of about 5 inches. A control button 57 on handle 54 permits entry of data signals to the host computer (not shown). The data entered with button 56 indicates to the host computer the use that is to be made of the information provided by the mouse. In one embodiment, the host computer is a Symbolics Computer, but other computers can be used with the present invention as well.

The transducers within base 52 are of a type described in the discussion of the prior art above. In other embodiments, they are of a type such as described in U.S. Pat. No. 4,364,035, entitled "Electro-Optical Mouse."

Figure 5:
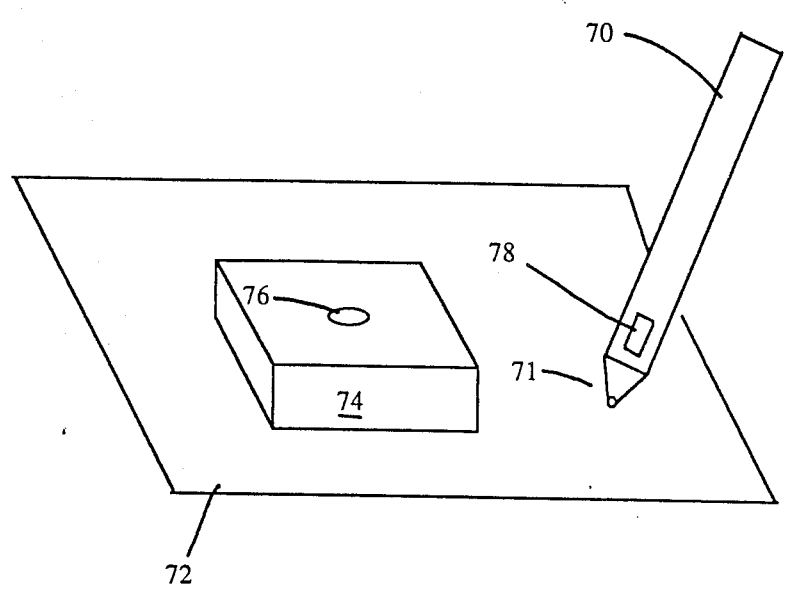
FIG. 5 is an illustration of a mouse constructed in accordance with another embodiment of the present invention.

Referring to FIG. 5, a stylus mouse 70 is roughly 0.3 inches in diameter and 5 inches long. At an eng 71 of stylus 70 are opto-electrical transducers such as the ones described above for detecting motion relative to a surface 72. Illustrated in FIG. 5 is a rectangular prism base 74 having a hole 76 formed therein. When it is desired to use the transducers within stylus mouse 70 in the more conventional manner, one merely inserts stylus mouse 70 in hole 76 and moves base 74. Stylus mouse 70 also includes a button 78 which performs the same function as button 56 described above.

While the invention has been described above with reference to a specific embodiment, those skilled in the art will recognize that changes can be made in form and detail without departing from the spirit and scope of the invention. For example, the stylus and base of the present invention can be used in conjunction with position or motion sensing transducers. Accordingly, all such changes come within the present invention.

I claim:

1. A mouse for providing electrical signals comprising:
   a wand having a transducer on one end;
   a base for resting on a surface, said base having a hole formed therein for receiving said wand, said transducer providing electrical signals in response to the position of said transducer relative to said surface during time periods in which said wand is inserted into said hole and during time periods in which said wand is not inserted into said hole, said wand having a shape such that said wand can be grasped and manipulated like a pen during said time periods in which said wand is not inserted in said hole, said base supporting said wand during said time periods in which said wand is inserted in said hole;
   a screen for providing an image; and
   computer means coupled to said transducer for receiving said electrical signals and for selecting a point on said screen in response to said electrical signals where said image is to be displayed.

2. A mouse for providing electrical signals comprising:
   a wand having a transducer on one end;
   a base for resting on a surface, said base having a hole formed therein for receiving said wand, said transducer providing electrical signals in response to motion of said transducer relative to said surface during time periods in which said wand is inserted into said hole and during time periods in which said wand is not inserted into said hole, said wand having a shape such that said wand can be grasped and manipulated like a pen during said time periods in which said wand is not inserted in said hole, said base supporting said wand during said time periods in which said wand is inserted in said hole;
   a screen for providing an image; and
   computer means coupled to said transducer for receiving said electrical signals and for selecting a point on said screen in response to said electrical signals where said image is to be displayed.

3. The mouse of claim 1 wherein said point is moved on said screen in response to the position of said transducer such that an operator can draw images on said screen by moving said transducer.

4. The mouse of claim 1 wherein said surface is substantially horizontal.

5. The mouse of claim 2 wherein said point is moved on said screen in response to motion of said transducer such that an operator can draw images on said screen by moving said transducer.

6. The mouse of claim 2 wherein said surface is substantially horizontal.

7. A mouse for providing electrical signals comprising:
   a wand having a transducer on one end;
   a base for resting on a surface, said base having a hole formed therein for receiving said wand, said transducer providing electrical signals in response to the position of said transducer relative to said surface during time periods in which said wand is inserted into said hole and during time periods in which said wand is not inserted into said hole, said wand having a shape such that said wand can be grasped and manipulated like a pen during said time periods in which said wand it not inserted in said hole, said base supporting said wand during said time periods in which said wand is inserted in said hole;
   a screen for providing an image; and
   computer means coupled to said transducer for receiving said electrical signals and for selecting a point on said screen in response to said electrical signals, the size of said point being independent of whether or not said wand is inserted in said hole.

8. A mouse for providing electrical signals comprising:
   a wand having a transducer on one end;
   a base for resting on a surface, said base having a hole formed therein for receiving said wand, said transducer providing electrical signals in response to motion of said transducer relative to said surface during time periods in which said wand is inserted into said hole and during time periods in which said wand is not inserted into said hole, said wand having a shape such that said wand can be grasped and manipulated like a pen during said time periods in which said wand is not inserted in said hole, said base supporting said wand during said time periods in which said wand is inserted in said hole;
   a screen for displaying an image; and
   computer means coupled to said transducer for receiving said electrical signals and for selecting a point on said screen in response to said electrical signals where said image is to be displayed, the size of said point being independent of whether or not said wand is inserted in said hole.

9. A mouse for providing electrical signals comprising:
   a wand having a transducer on one end;
   a base for resting on a surface, said base having a hole formed therein for receiving said wand, said transducer providing electrical signals in response to the position of said transducer relative to said surface during time periods in which said wand is inserted into said hole and during time periods in which said wand is not inserted into said hole, said wand having a shape such that said wand can be grasped and manipulated like a pen during said time periods in which said wand is not inserted in said hole, said base supporting said wand during said time periods in which said wand is inserted in said hole;
   a screen for providing an image; and
   computer means coupled to said transducer for receiving said electrical signals and for positioning a cursor on said screen in response to said electrical signals.

10. A mouse for providing electrical signals comprising:
    a wand having a transducer on one end;
    a base for resting on a surface, said base having a hole formed therein for receiving said wand, said transducer providing electrical signals in response to motion of said transducer relative to said surface during time periods in which said wand is inserted into said hole and during time periods in which said wand is not inserted into said hole, said wand having a shape such that said wand can be grasped and manipulated like a pen during said time periods in which said wand is not inserted in said hole, said base supporting said wand during said time periods in which said wand is inserted in said hole;
    a screen for providing an image; and
    computer means coupled to said transducer for receiving said electrical signals and for positioning a cursor on said screen in response to said electrical signals.

* * * * *